United States Patent [19]

Komanduri et al.

[11] 4,356,376

[45] Oct. 26, 1982

[54] PULSE LASER PRETREATED MACHINING

[75] Inventors: Ranga Komanduri; Minyoung Lee, both of Schenectady; Donald G. Flom, Scotia; Robert A. Thompson, Quaker Street; Marshall G. Jones, Scotia; Robert J. Douglas, Schenectady, all of N.Y.

[73] Assignee: General Electric Company, Schenectady, N.Y.

[21] Appl. No.: 263,235

[22] Filed: May 13, 1981

[51] Int. Cl.$^3$ .......................................... B23K 27/00
[52] U.S. Cl. ........................... 219/121 LN; 29/27 C; 82/1 C; 219/121 LH; 219/121 LJ; 219/121 LG; 219/121 LK; 219/121 LL; 219/121 FS
[58] Field of Search ............... 219/121 LN, 121 LG, 219/121 LH, 121 LK, 121 LL, 121 FS, 121 L, 121 LM; 82/1 C, DIG. 1; 29/27 C, 558

[56] References Cited

U.S. PATENT DOCUMENTS

| | | | |
|---|---|---|---|
| 3,265,855 | 8/1966 | Norton | 219/121 |
| 3,696,504 | 10/1972 | Cupler | 29/558 |
| 4,098,153 | 7/1978 | Clark et al. | 82/1 C |
| 4,163,402 | 8/1979 | Bykhovsky et al. | 82/1 C |
| 4,170,726 | 10/1979 | Okuda | 219/121 LM |
| 4,201,905 | 5/1980 | Clark et al. | 219/121 L |
| 4,220,842 | 9/1980 | Stürmer et al. | 219/121 LM |
| 4,229,640 | 10/1980 | Longo | 219/121 LJ |

FOREIGN PATENT DOCUMENTS 1549218  7/1979  United Kingdom .......... 219/121 FS

OTHER PUBLICATIONS

Michael Bass, et al., *American Institute of Physics,* "Laser Assisted Hot Spot Machining", pp. 205–211, 1979.

Mayfield, *Aviation Week and Space Technology,* "Advanced Machining Processes, Tooling", pp. 54–56, Sep. 15, 1980.

*Primary Examiner*—C. L. Albritton
*Attorney, Agent, or Firm*—Donald R. Campbell; James C. Davis, Jr.; Marvin Snyder

[57] ABSTRACT

An improved laser-assisted machining process has special application to difficult-to-machine materials such as the titanium alloys and high temperature superalloys. A layer of material to be removed by a cutting tool is made weaker by drilling a series of holes using a pulse laser beam ahead of the cutting process so that the tool removes the rest of the weaker material with relative ease. There is a decrease of cutting forces, breakage of the chip to a manageable size, and reduced tool wear.

9 Claims, 6 Drawing Figures

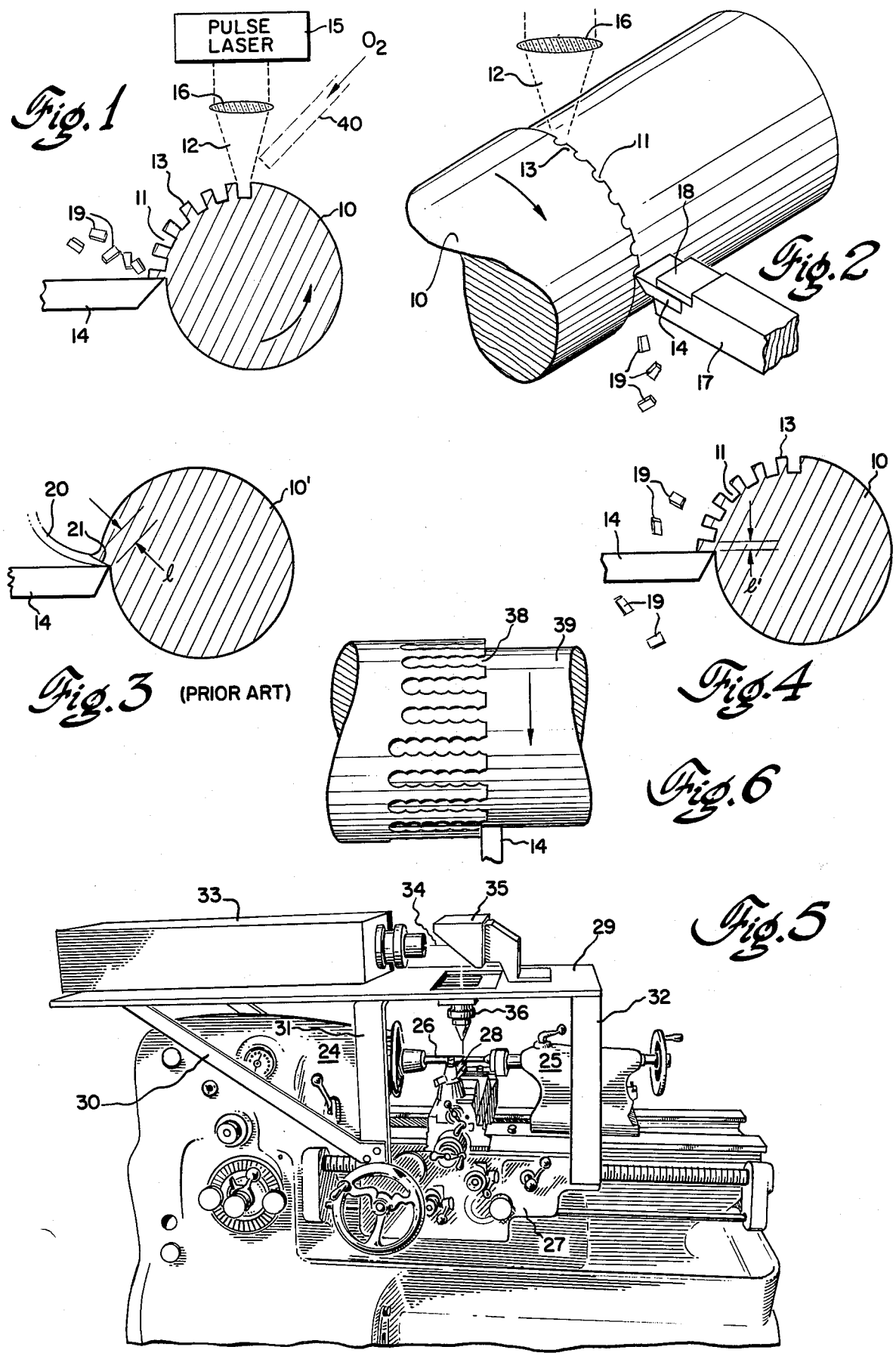

PULSE LASER PRETREATED MACHINING

BACKGROUND OF THE INVENTION

This invention relates to an improved method of machining the difficult-to-machine materials.

Certain materials such as the titanium alloys and high temperature superalloys are extremely difficult to machine due to their inherent chemical and physical properties; among the former are the high chemical reactivity with the tool material and the environment, and among the latter are high yield strength at temperatures close to the melting temperature of the alloys together with poor thermal properties. In fact, the verty properties that render the superalloys suitable for high temperature applications are responsible for their poor machinability. Consequently, in most cases, these materials have to be machined at lower speeds (45–125 surface feet per minute). For this and other machining applications there are additional restrictions on the machine tools such as the vibrations that affect finish, limited availability of power that afffects the removal rate, etc. All this reduces the productivity and increases the cost.

One way of improving the efficiency of machining these materials is to weaken them by a secondary operation, such as by heating. In the past, researchers have suggested various methods of heating including induction heating, furnace heating, resistance heating, and plasma arc heating, but lack of control of the small area to be heated was the main drawback with these sources. A continuous wave laser, with its small spot size and supposedly better focusing ability, offers an alternative source for heating a small area to a small depth of cut, and can be used either to heat up the layer to be machined off just prior to the arrival of the material into the shear zone or at some convenient small lag angle (up to 10°). The former weakens the material by heating it locally to high temperature but may have some drawbacks including higher tool-chip interface temperature and consequent rapid tool wear, lack of adequate focusing control of heat at or near the shear zone, and generation of a long continuous chip which is difficult to handle and can damage the machined part.

SUMMARY OF THE INVENTION

A laser operated in pulse mode is used to decrease the cutting force by mechanically altering the outer surface of the difficult-to-machine workpiece prior to machining with a cutting tool. Pulse laser pretreatment ahead of cutting involves laser vaporization and formation of a series of holes in the layer of material to be removed, thus weakening the material for subsequent machining. The laser is a neodymium-YAG (yttrium-aluminum-garnet) pulse laser, or its equivalent, which has a high pulse rate such as 400 pulses per second. There is a significant reduction in cutting forces (hence energy) when machining the material that is laser predrilled. The reduction in energy is much more than due to reduction in the volume of material due to laser predrilling. Moreover, the chip that is removed is segmented and broken into small pieces and there is reduced tool wear.

The depth of the radial holes in the layer of material to be removed is less than the depth of cut of the cutting tool, and the hole diameter is greater than the chip width and the cross feed of the lathe. Preferably, the laser is mounted on the machine tool carriage and the laser treats the workpiece while cutting; the pulse laser beam impinges on the workpiece 90° or less in advance of the horizontal cutting tool. An alternative two-step method is to drill rows of holes in the workpiece, followed by machining on a lathe. Enhanced material removal by the pulsed laser is realized by application of a gas such as oxygen.

BRIEF DESCRIPTION OF THE DRAWING

FIG. 1 is a schematic cross section of a workpiece with laser predrilled holes which is machined by a cutting tool;

FIG. 2 is a partial perspective view of the pretreated workpiece and cutting tool;

FIG. 3 illustrates prior art single point turning to remove a continuous chip;

FIG. 4 illustrates pulse laser pretreated machining and the reduced length of the shear plane;

FIG. 5 is a simplified perspective of a conventional lathe modified to have laser equipment supported on and movable with the carriage; and FIG. 6 is a top view of a workpiece which has rows of laser drilled holes in the layer that, as a second step, is machined off.

DESCRIPTION OF THE PREFERRED EMBODIMENTS

The titanium alloys, high temperature nickel-based superalloys, and other difficult-to-machine materials have to be machined at low speeds. Even at these lower speeds, if the feed and/or depth of cut can be increased with the same cutting force, the amount of material removal could be increased for the same amount of power input. This is accomplished by reducing the shearing force on the shear plane, and one way of doing this is by mechanical weakening. A laser operated in a pulse mode is used to decrease the cutting force by altering the surface prior to cutting with a single point tool.

The workpiece 10 in FIGS. 1 and 2 is, for instance, a one inch diameter 6-4 titanium (6 percent aluminum, 4 percent vanadium, titanium alloy) rod. A series of circumferentially spaced holes 11 are formed by a focused pulse laser beam 12 in the outer surface of the workpiece in a layer 13 of material to be removed by a cutting tool 14. The depth of predrilled radial holes 11 is no greater than the depth of cut of the cutting tool, and the depth to diameter aspect ratio of the holes is between 1 and 2. The hole diameter is greater than the cross feed per revolution of the cutting tool and is larger than the expected chip width. The pulse laser 15 is a neodymium-YAG laser, or its equivalent, having a minimum repetition rate of 400 pulses per second. The beam is focused by an objective lens 16 to a small spot at the surface of the workpiece. Since the laser treatment of the workpiece is vaporization of surface material, the objective lens must be protected. The cutting tool such as tungsten-carbide tool insert 14 is mounted on a tool holder 17 which has a conventional built-in or external chip breaker 18, and meets the workpiece 90° from laser beam impingement. The chip is automatically broken by the cutting action, and chip segments 19 may be disposed of easily.

The length of the shear plane is reduced by this pulse laser pretreatment ahead of the cutting process, and hence there is a reduction in cutting force. There is, in fact, as much as a 50 percent reduction of cutting force. Conventional single-point turning with a lathe will produce a continuous chip as is illustrated in FIG. 3. A solid layer of material is removed from the surface of workpiece 10' and the chip 20 is long and unbroken. The shear pulse indicated at 21 extends diagonally and has a length l. The shear plane l' in the pulse laser predrilled case, FIG. 4, extends vertically from the trailing edge of one predrilled hole 11 to the leading edge of the next hole, and has a shorter length. A comparison of machining the solid layer with the laser predrilled layer shows a significant reduction in forces, and hence energy, when machining material that is laser pretreated. The reduction in energy is much more than due to the reduction of the volume of material due to laser predrilling. Tests confirming this were conducted on a lathe at 100 surface feet per minute. Tool wear for a tungsten-carbide tool material was also tested by making a comparison between a tool used for pulse laser assisted machining and a tool used without lase assist. A crater was worn into the face of the carbide tool during non-laser cutting, but when laser assisted machining was used, no crater was formed with identical cutting conditions. There is a tool wear improvement as well as a significant reduction in forces.

The size of the predrilled holes depends on the material being machined. The diameter of the holes is typically 0.010 inch to 0.060 inch and their depth is 0.020 inch to 0.060 inch. It is preferred that the depth of cut is slightly deeper than the hole depth. The cross feed per revolution of the cutting tool is typically 0.006 inch and the chip width is usually somewhat greater than the cross feed. The hole diameter, as was mentioned, is greater than the expected chip width. In the circumferential direction, the predrilled holes in experiments that have been conducted are about 1/32 inch apart at work speeds of roughly 60 sfpm, which is typical for the superalloys such as Inconel 718. Instead of directing the pulse laser beam vertically downward to the workpiece, the laser beam impingement can be less than 90° in advance of the cutting tool. If the holes are laser drilled close to the point of contact of the cutting tool, the material is also weakened by the heating effect and there is a gain.

FIG. 5 shows a conventional lathe which is modified to perform pulse laser assisted machining. The pulse laser beam and cutting tool are synchronized and move together, and this is accomplished by mounting the laser head and associated optics rigidly to the carriage of the lathe. A Raytheon high pulse rate 400 watt Nd-YAG laser is interfaced with a 9 inch Monarch lathe. This 1.06 micrometer wavelength laser is capable of repetition rates of 400 pulses per second with a maximum average power output of 125 watts; the maximum energy generated is approximately 0.4 joules per pulse at 400 pps. Energy per pulse can be increased with decreasing pulse rates. The headstock of the lathe is generally indicated at 24, the tailstock at 25, the workpiece at 26, the horizontally movable carriage at 27, and the tool holder and cutting tool at 28. A laser equipment table 29 is supported above the lathe, on the horizontally movable carriage 27, by means of struts 30–32. Laser head 33 generates the laser beam 34 which is deflected by a mirror 35 and focused onto the surface of the workpiece by the objective lens 36. A plastic film or tape (not shown) moves continuously between the objective lens and workpiece to protect the former during laser assisted machining. There is flexibility for aligning the laser beam and cutting tool in the same plane which is normal to the workpiece axis of rotation. There is also a vertical adjustment of the objective lens which enables variation in the laser focused spot size and therefore the resulting power density. A binocular microscope is used to locate the focal plane.

Experiments that were performed verified the decrease of cutting forces, breakage into short chips, and reduced tool wear during pulse laser assisted machining. In performing these cutting tests, the laser was operating at an average power output of approximately 125 watts, and the laser beam pulse width (pulse length) was 200 microseconds while the pulse rate was 400 pps. The average energy pulse under these conditions is approximately 0.31 joules/pulse. The resulting peak power per pulse is 1.6 kilowatts and the corresponding power density is $2 \times 10^5$ watts/cm$^2$. Typical energy density per pulse is approximately 40 joules/cm$^2$. These parameters result from a cutting speed of 63 sfpm.

Oxygen was used during certain test runs to increase laser material vaporization. The workpiece was bathed in a low flow of oxygen cover gas delivered by tube 40, FIG. 1, and this increased the percent force reduction. The use of this and other gases may be beneficial during this treatment.

An alternative but less desirable two-step method involves initially treating the workpiece with a pulse laser followed by machining on a lathe. Referring to FIG. 6, circumferentially spaced, axially extending rows of holes 38 are drilled in the surface of workpiece 39 as it is rotated, in the layer of material to be machined, by a pulse laser. The holes in every row usualy overlap one another. Subsequently, the laser pretreated workpiece is machined on a lathe. This is the full equivalent of having the pulse laser treat the workpiece while cutting, and the same advantages of reduced cutting forces and energy, chip breakage, and improved tool wear are realized.

Either method can be implemented with two or more pulse lasers that are synchronized. High pulse rates are readily achieved in this manner. Continuous wave lasers, it will be noted, cannot be cascaded.

Other information and photographs are given in Aviation Week and Space Technology, Vol. 113, No. 11, Sept. 15, 1980, pp. 54–56.

While the invention has been particularly shown and described with reference to preferred embodiments thereof, it will be understood by those skilled in the art that various changes in form and details may be made therein without departing from the spirit and scope of the invention.

The invention claimed is:

1. A method of machining a workpiece made of a difficult-to-machine material comprising:
    pretreating the outer surface of the workpiece prior to the cutting process by using a pulse laser beam to drill circumferentially spaced holes in a layer of material to be removed, said holes having a depth no greater than a known depth of cut of a cutting tool; and
    rotating said workpiece relative to said cutting tool to remove the layer of material which is weakened by said holes and to generate a segmented chip.

2. The method of claim 1 wherein the diameter of said pulse laser drilled holes is greater than the width of said chip.

3. The method of claim 1 wherein the depth-to-diameter aspect ratio of said pulse laser drilled holes is 1 to 2.

4. The method of claim 1 wherein said pulse laser beam is generated by a 1.06 micrometer wavelength laser.

5. A method of machining a workpiece made of a difficult-to-machine material such as the titanium alloys and high temperature superalloys, comprising:

rotating the workpiece and pretreating its outer surface prior to the cutting process by using a pulse laser beam to drill a series of radial holes in a layer of material to be removed, said holes having a depth no greater than a known depth of cut of a single-point cutting tool and a diameter greater than an expected chip width; and removing, with said cutting tool, the pretreated layer of material which has been weakened by said series of holes, and generating a segmented chip.

6. The method of claim 5 wherein said pulse laser beam is generated by a neodymium-YAG laser operated in pulse mode.

7. The method of claim 5 wherein said pulse laser beam is generated by a neodymium-YAG laser having a repetition rate of at least 400 pulses per second.

8. The method of claim 5 wherein said pulse laser drilled holes have a depth between 0.020 inch and 0.060 inch and a diameter between 0.010 inch and 0.060 inch.

9. The method of claim 5 wherein the workpiece is bathed with a gas to enhance material removal by said pulse laser beam.

* * * * *